(12) United States Patent
Wiemero et al.

(10) Patent No.: US 6,360,531 B1
(45) Date of Patent: Mar. 26, 2002

(54) SYSTEM AND METHOD FOR REDUCING VEHICLE EMISSIONS

(75) Inventors: Timo Aimo Waltteri Wiemero, Canton; Daniel Lawrence Meyer, Dearborn; Philip William Husak, Southgate; William Francis Stockhausen, Northville, all of MI (US)

(73) Assignee: Ford Global technologies, Inc., Dearborn, MI (US)

( * ) Notice: Subject to any disclaimer, the term of this patent is extended or adjusted under 35 U.S.C. 154(b) by 0 days.

(21) Appl. No.: 09/649,928

(22) Filed: Aug. 29, 2000

(51) Int. Cl.[7] .................................................. F01N 3/00
(52) U.S. Cl. ............................. 60/284; 60/274; 60/285; 123/90.15; 123/90.11; 123/299; 123/478
(58) Field of Search .................... 60/285, 274, 284; 123/90.11, 90.15, 90.16, 90.17, 299, 300, 430, 431, 478

(56) References Cited

U.S. PATENT DOCUMENTS

| 4,327,689 | A | | 5/1982 | Rachel |
| 4,719,885 | A | | 1/1988 | Nagano et al. |
| 5,076,238 | A | | 12/1991 | Rosenau et al. |
| 5,228,422 | A | | 7/1993 | Wakeman |
| 5,231,962 | A | | 8/1993 | Osuka et al. |
| 5,233,831 | A | * | 8/1993 | Hitomi et al. ................ 60/284 |
| 5,293,741 | A | | 3/1994 | Kashiyama et al. |
| 5,398,502 | A | | 3/1995 | Watanabe |
| 5,531,203 | A | | 7/1996 | Komatsuda et al. |
| 5,590,633 | A | | 1/1997 | Tomisawa et al. |
| 5,839,453 | A | * | 11/1998 | Hu .............................. 123/322 |
| 5,850,811 | A | | 12/1998 | Tomisawa et al. |
| 5,890,467 | A | | 4/1999 | Romzek |
| 6,032,642 | A | | 3/2000 | Trumbower et al. |
| 6,055,948 | A | * | 5/2000 | Shiraishi et al. .......... 123/90.15 |
| 6,128,899 | A | * | 10/2000 | Oono et al. .................... 60/295 |
| 6,134,884 | A | * | 10/2000 | Morinaga ...................... 60/285 |
| 6,182,621 | B1 | * | 2/2001 | Salber et al. ............. 123/90.15 |

* cited by examiner

*Primary Examiner*—Thomas Denion
*Assistant Examiner*—Binh Tran
(74) *Attorney, Agent, or Firm*—Ford Global technologies, Inc.

(57) ABSTRACT

A method and system 10 for reducing cold-start emissions of an automotive vehicle 12 having an internal combustion engine 26. System 10 includes a main controller or control system 14, a variable valve timing system 16, an ignition system 18, a fuel metering system 20, and vehicle operating condition sensors 22. Controller 14 detects cold-start conditions based on signals received from sensors 22, and in response to such a detection, controller 14 generates command signals to said variable valve timing system 16, to said ignition system 18, and to said fuel metering system 20, effective to respectively alter valve timing, spark timing, and said air/fuel delivery of engine 26 in a manner which synergistically increases air/fuel enleanment limits, improves combustion characteristics, and increases exhaust gas temperature, thereby reducing cold-start emissions.

17 Claims, 5 Drawing Sheets

SYSTEM AND METHOD FOR REDUCING VEHICLE EMISSIONS

FIELD OF THE INVENTION

This invention relates to a system and method for reducing cold-start emissions and more particularly, to a system and method for reducing vehicle emissions which synergistically utilizes variable valve timing, ignition timing and air/fuel ratio enleanment strategies to achieve rapid catalyst "light off", thereby reducing emissions during cold-start conditions.

BACKGROUND OF THE INVENTION

Automotive vehicles having internal combustion engines typically utilize a three-way-catalyst ("TWC") to reduce tailpipe emissions. Particularly, the TWC catalytically reduces nitrogen oxides (NOx) and oxidizes carbon monoxide ("CO") and unburned hydrocarbons ("HC") which are produced during the combustion process. The TWC has a very high conversion efficiency once the catalyst has "warmed up" and the air/fuel ratio of the mixture is near its stoichiometric point.

The point in time at which the catalytic converter reaches a fifty percent (50%) efficiency is commonly referred to as its "light-off" time. Due to the relatively poor efficiency of the catalytic converter prior to "light-off", recent efforts to reduce tailpipe emissions have concentrated on reducing the "light-off" time, thereby reducing the time during which the catalytic converter is least efficient. These prior efforts have also included concomitantly altering the air/fuel ratio and/or retarding the spark calibration of the engine. These efforts are commonly referred to as Coordinated Strategies for Starting with Reduced Emissions or "CSSRE", and are described for example and without limitation in U.S. Pat. Nos. 5,483,946 and 5,584,176, which are fully and completely incorporated herein by reference.

These prior efforts have suffered from some drawbacks. Particularly, the difficulty in controlling the combustion quality and stability of the engine, noise and vibration harshness, and vehicle "drivability" as the vehicle warms up limit the application of these prior strategies.

There is therefore a need for a system and method for reducing vehicle cold-start emissions which overcomes the drawbacks of prior emissions reducing methods, strategies and systems.

SUMMARY OF THE INVENTION

It is a first object of the invention to provide a system and method for reducing vehicle cold-start emissions which overcomes at least some of the previously delineated drawbacks of prior emissions reducing methods and strategies.

It is a second object of the invention to provide a system and method for reducing vehicle cold-start emissions which synergistically utilizes variable valve timing, ignition timing and air/fuel ratio enleanment strategies to achieve rapid catalyst "light off", thereby reducing emissions during cold-start conditions.

It is a third object of the invention to provide a system and method for reducing vehicle cold-start emissions which utilizes direct and/or indirect feedback to adapt ignition timing, air/fuel ratio enleanment, and valve timing events to achieve optimum emissions reduction and vehicle drivability.

It is a fourth object of the invention to provide a system and method for reducing vehicle cold-start emissions which utilizes variable valve timing events to expand the operational ranges of CSSRE ignition timing and air/fuel ratio enleanment schedules without deterioration of combustion quality and vehicle drivability (e.g., NVH issues).

It is a fifth object of the invention to provide a system and a method for reducing vehicle cold-start emissions which utilizes camless valve actuators to assist in fuel preparation during cold-start operating conditions.

It is a sixth object of the invention to provide a system and a method for reducing vehicle cold-start emissions which utilizes multiple valve events during a single intake stroke to reduce the amount of fuel deposited on a valve, thereby increasing evaporation of the fuel and improving combustion. Additionally, multiple openings of the intake valve may also improve combustion through better air/fuel mixture preparation by increasing in-cylinder fuel shearing and turbulence.

According to a first aspect of the present invention, a method is provided for reducing emissions of a vehicle of the type having an engine. The method includes the steps of detecting a cold-start condition; and selectively and synergistically altering valve timing, spark timing, and air/fuel delivery to the engine, effective to extend air/fuel enleanment limits, to improve combustion characteristics, and to increase exhaust gas temperature, thereby reducing cold-start emissions.

According to a second aspect of the present invention, a method is provided for reducing emissions of a vehicle of the type having an engine including a combustion chamber with at least one valve and a fuel injector which discharges an amount of fuel which is delivered to the chamber through the at least one valve. The method includes the step of selectively opening and closing the at least one valve multiple times during an intake stroke of the engine, thereby increasing vaporization of the amount of fuel, effective to increase combustion efficiency and exhaust gas temperature, thereby reducing emissions. Additionally, multiple openings of the intake valve may also improve combustion through better air/fuel mixture preparation by increasing in-cylinder fuel shearing and turbulence.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
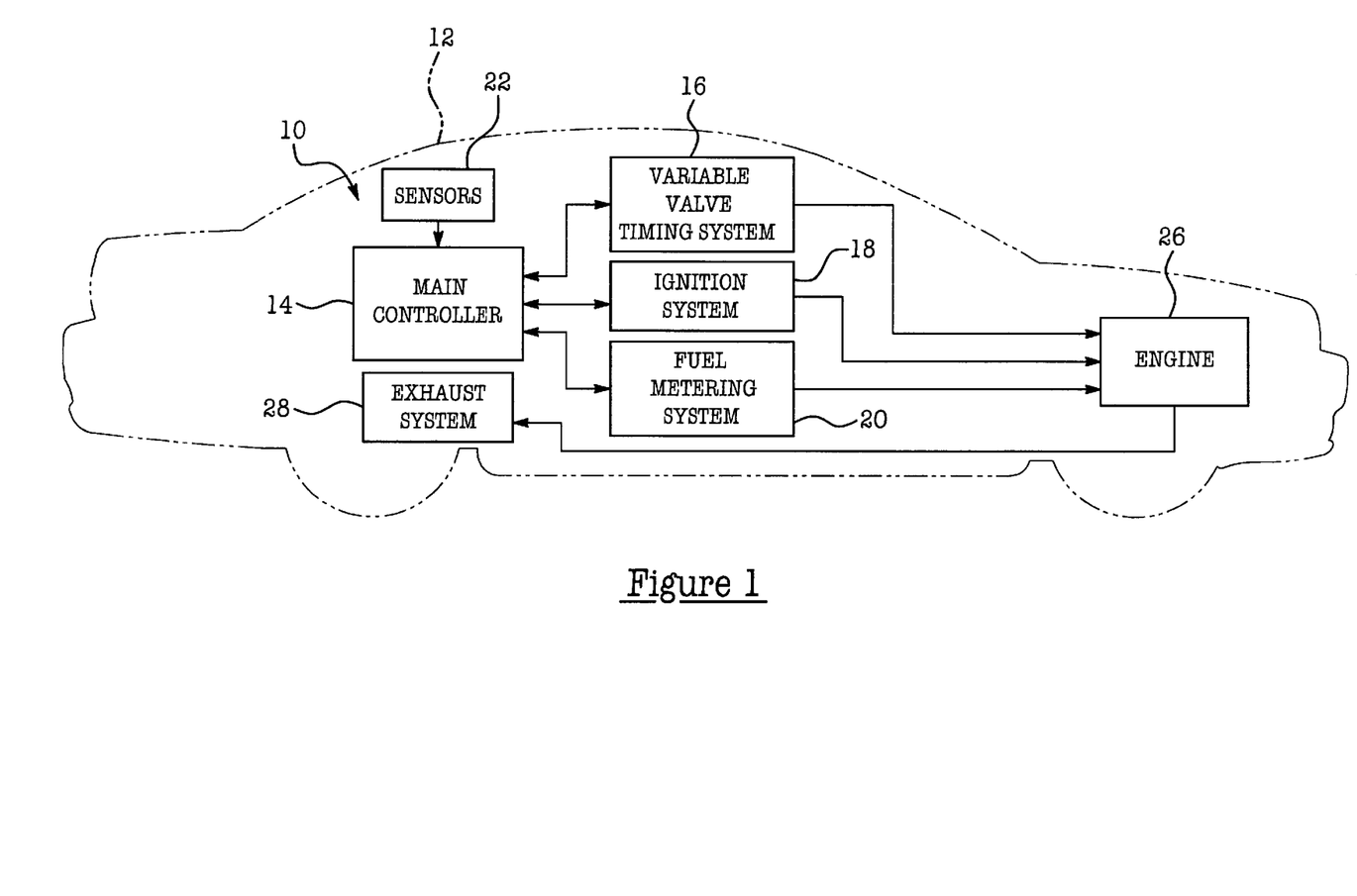
FIG. 1 is a block diagram of a vehicle which employs an emissions reducing system which is made in accordance with the teachings of a preferred embodiment of the present invention.

Referring now to FIG. 1, there is shown a system 10 for reducing cold-start emissions of an automotive vehicle 12 having an internal combustion engine 26 which is made in accordance with the teachings of the preferred embodiment of the present invention. System 10 includes a main controller or control system 14, a variable valve timing system 16, an ignition system 18, a fuel metering system 20, and sensors 22. Variable valve timing system 16, ignition system 18, and fuel metering system 20 are communicatively coupled to and control the operation of engine 26 (e.g., the valve timing events, spark events, and air/fuel intake of engine 26).

Controller 14 is electrically and communicatively coupled to variable valve timing system 16, ignition system 18, fuel metering system 20, and sensors 22. Controller 14 receives signals generated by sensors 22 and feedback from systems 16–20, and processes and utilizes the received signals and feedback to adapt CSSRE ignition timing, air/fuel ratio enleanment and valve timing schedules to achieve optimum emissions reduction and vehicle drivability, as described more fully and completely below.

Engine 26 is a conventional internal combustion engine which includes one or more cylinders (e.g., four, six, eight, or more cylinders). Engine 26 is operatively coupled to the vehicle's drive line and to a conventional exhaust system 28 which includes a conventional catalytic converter (not shown). The exhaust system 28 transfers and/or communicates the burnt exhaust gases resulting from the internal combustion of engine 26 through the catalytic converter, which treats the exhaust gases and removes undesirable emissions before the gases are discharged into the atmosphere.

In the preferred embodiment, controller 14 includes several microprocessors or microcontrollers as well as other chips and integrated circuits which cooperatively control the operation of system 10. Controller 14 may comprise one or more commercially available, conventional, and disparate chips or devices, which are operatively and communicatively linked in a cooperative manner. Controller 14 includes permanent and temporary memory units, which are adapted to and do store at least a portion of the operating software which directs the operation of controller 14. Particularly, controller 14 includes conventional software, hardware and/or firmware of the type which is used to command and/or control the variable valve timing system 16, ignition or spark system 18 and the fuel metering system 20.

Variable valve timing system 16 is a conventional variable valve timing system which may include a controller and one or more cam timing assemblies which are mounted on the engine's camshafts and which selectively phase the rotation of the camshafts relative to each other and to the crankshaft, thereby controlling the actuation of the intake and exhaust valves. In one non-limiting embodiment, engine 26 is a "camless" type engine and variable valve timing system 16 is a camless system including several controllable electromagnetic, electromechanical and/or electrohydraulic actuators which independently operate opening and closing of the engine's intake and exhaust valves.

Ignition system 18 is a conventional ignition system which is adapted to selectively control the spark timing within the cylinders of the engine. Fuel metering system 20 is a conventional fuel metering system which is adapted to selectively control the air/fuel ratio which is delivered to the various cylinders of the engine.

Sensors 22 comprise a plurality of conventional and commercially available sensors which measure and/or acquire information pertaining to engine 26 and vehicle 12 (e.g., vehicle operating condition data). In the preferred embodiment of the invention, sensors 22 include one or more conventional vehicle and/or engine sensors adapted to estimate and/or determine the speed and/or load of engine 26, the temperature of the engine 26, the engine throttle position, the engine coolant temperature, the catalyst temperature or operating efficiency, and other engine operating conditions. Sensors 22 generate one or more signals to controller 14 based upon these measured and/or estimated values. Particularly, sensors 22 provide vehicle operating data to control system 14 which utilizes this data to determine the appropriate emissions reducing strategy.

Figure 2A:
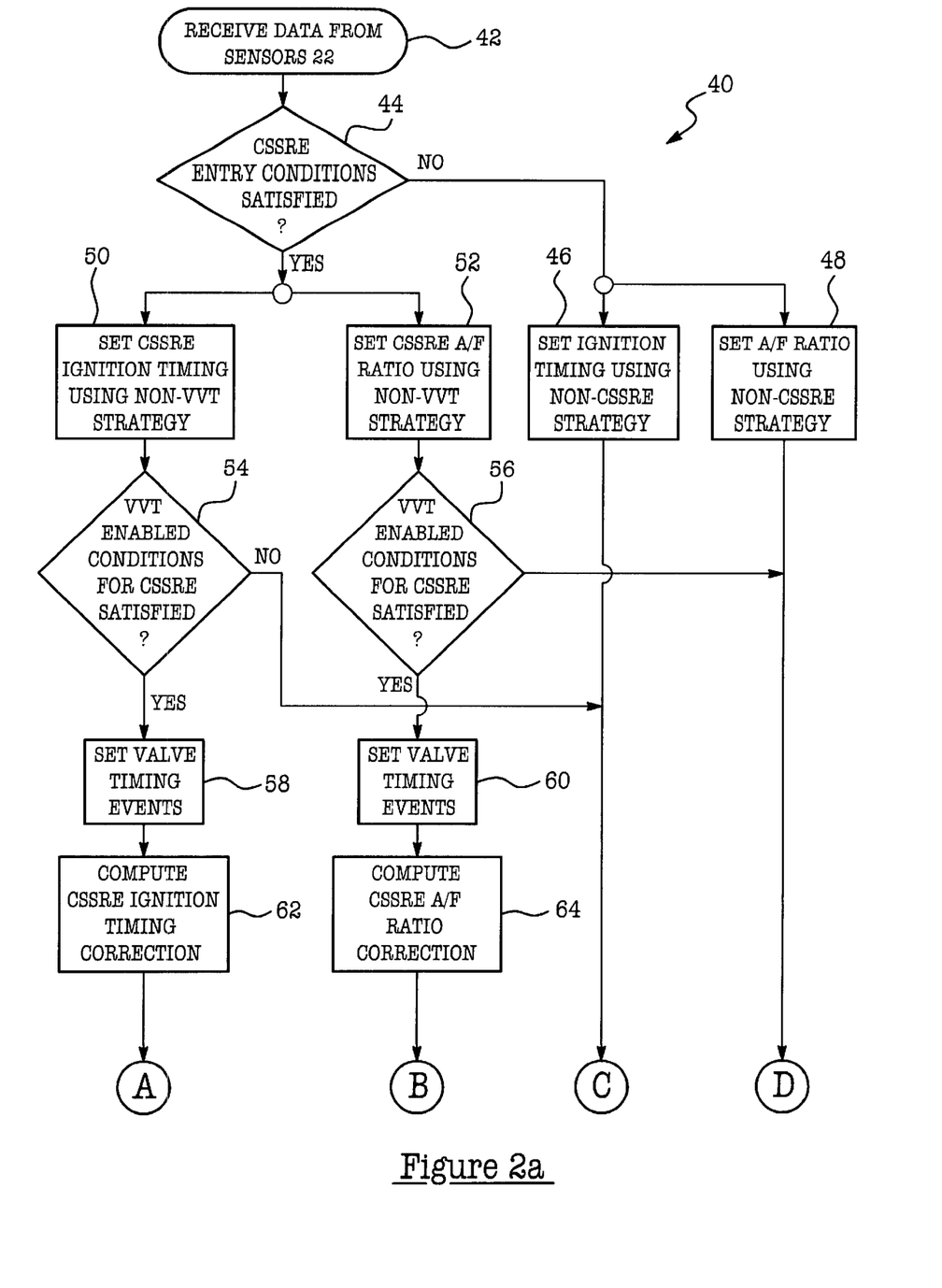
FIGS. 2a and 2b are block diagrams illustrating a method used by the system shown in FIG. 1 to reduce cold-start exhaust emissions and which is performed in accordance with the teachings of the preferred embodiment of the present invention.
Figure 2B:
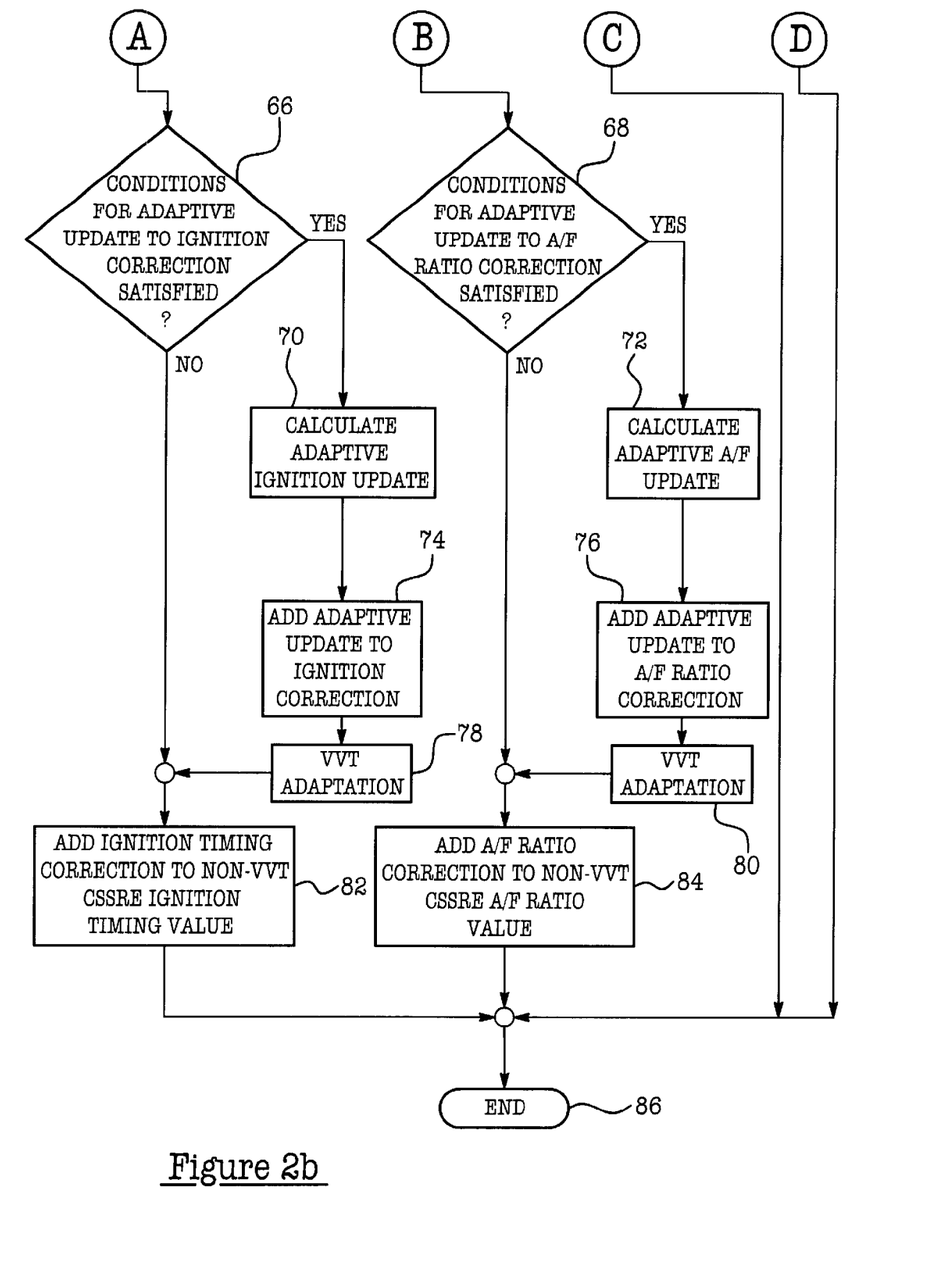

In operation, the present system coordinates variable valve timing ("VVT") events with CSSRE ignition and air/fuel ratio enleanment strategies in order to achieve rapid catalyst warm-up for reduced tailpipe emissions during vehicle cold-start operation. Referring now to FIGS. 2a and 2b, there is shown one non-limiting embodiment of a method 40 performed by system 10 to reduce the emissions of vehicle 12. Method 40 begins with step 42, where controller 14 receives data and/or signals from vehicle sensors 22. Based upon this received data, controller 14 determines whether a "cold-start" condition exists, as shown in step 44. The determination of a "cold-start" condition is based upon one or more measured engine operating conditions, such as the temperature, load and/or speed of the engine 26, the engine throttle position, the engine coolant temperature, and the catalyst temperature or operating efficiency, which are compared to one or more calibratable parameters stored within controller 14.

If a cold-start condition is not detected, controller 14 proceeds to steps 46 and 48, where controller 14 respectively sets the ignition timing and air/fuel ratio using conventional non-CSSRE strategies (e.g., controller 14 communicates command signals to ignition system 18 and fuel metering system 20, effective to cause systems 18, 20 to perform conventional non-CSSRE strategies). If a cold-start condition is detected, controller 14 proceeds to steps 50 and 52, where the controller 14 respectively sets the ignition timing and air/fuel ratio using conventional CSSRE strategies (e.g., controller 14 communicates command signals to ignition system 18 and fuel metering system 20, effective to cause systems 18, 20 to perform conventional CSSRE strategies).

Controller 14 then proceeds to blocks 54, 56 where it performs tests to determine whether or not a variable valve timing ("VVT") strategy should be enabled during CSSRE operation. Parameters that are tested can include, but are not limited to, the driver's demand for torque or engine throttle position, vehicle speed, engine coolant temperature, and catalyst efficiency or catalyst operating temperature. In one non-limiting embodiment, the vehicle's throttle position, speed, coolant temperature and catalyst temperature must all exceed certain predetermined calibratable threshold values prior to controller 14 implementing the VVT strategy. In other non-limiting embodiments, entry conditions may be based on engine speed, engine load, barometric pressure, NVH feedback, emissions feedback, and/or time since exiting crank.

If the conditions in steps 54 and 56 are not met, controller 14 exits methodology 40 and uses only "non-VVT" strategies (i.e., only ignition timing and air/fuel ratio strategies). Otherwise, the VVT strategy is enabled, and the valve timing events are set, as shown in steps 58 and 60. In one non-limiting embodiment of the invention, the intake valve opening ("IVO") and closing ("IVC") events and the exhaust valve opening ("EVO") and closing ("EVC") events are set independently. In other embodiments, only one or more of these events can be independently set or adjusted.

For example and without limitation, in one non-limiting embodiment only the EVO events are adjusted. In one non-limiting embodiment, the EVC and IVO events are set or adjusted to control valve "overlap", and in another embodiment, only the IVC events are set or adjusted.

In the preferred embodiment, the foregoing valve timing events may be independently set as a function of vehicle speed, engine coolant temperature, throttle position, catalyst efficiency, catalyst operating temperature, barometric pressure, engine load, combustion quality/NVH feedback, and/or other engine and/or vehicle control system parameters.

For example and without limitation, during CSSRE idle and light load conditions, EVO is selectively advanced (i.e., earlier opening) allowing hotter combustion gases to be discharged through the exhaust port, thereby facilitating catalyst warm-up. The EVC and IVO can also be set to eliminate the valve "overlap" period. In this manner, more retarded or delayed CSSRE ignition timings can be implemented without deteriorating combustion quality. These retarded or delayed timings produce higher exhaust gas temperatures, further facilitating catalyst warm-up.

Controller 14 then proceeds to steps 62 and 64, where, CSSRE ignition timing and air/fuel ratio correction terms are computed based on the valve timing event. Particularly, controller 14 alters the ignition timing and air/fuel ratio to synergistically cooperate with the altered valve timing to achieve the desired combustion characteristics or stability and reduced emissions. Separate CSSRE ignition timing calculations can be made for EVO events, valve overlap, and IVC events. For example and without limitation, for the EVO case, a correction factor with additional spark retard can be computed. This added ignition timing retard increases heat rejection into the exhaust, further facilitating catalyst warm-up.

In steps 66, 68, controller 14 determines whether the calculated CSSRE ignition timing and air/fuel ratio correction terms and the VVT events should be adaptively updated (i.e., are certain predetermined calibratable conditions present which would justify or require updating to take place). Particularly, controller 14 monitors feedback from systems 16–20 and data from sensors 22 to determine whether the valve timing, spark timing and/or air/fuel delivery should be adapted to further improve the stability and emissions qualities of the vehicle. If the conditions are met, the calculated CSSRE ignition timing and air/fuel ratio correction terms and the VVT events are adaptively updated in steps 70–80. Particularly, in steps 70 and 72, ignition timing and air/fuel ratio updates are calculated using feedback based on previous operational data. The updates are used to modify the ignition timing and air/fuel ratio to improve emissions, NVH and drivability. In steps 74 and 76, the calculated updates or modifiers are added to the ignition and air/fuel ratio correction terms. In steps 78 and 80, the VVT events are updated using feedback based on previous operational data. Using combustion quality, NVH and/or emissions feedback, the foregoing adaptive updates can be made based on time spent at a particular engine and/or vehicle operating condition of speed, load, or throttle position. Other engine and/or vehicle operating conditions may also be used for adaptation. Individual adaptation can be made based on each valve timing event (i.e., on IVO, IVC, EVO and EVC events).

In steps 82 and 84, the CSSRE ignition timing and air/fuel ratio corrections are added (e.g. signed addition) to the respective non-VVT ignition timing and air/fuel ratio values. The final ignition timing and air/fuel ratio values are then scheduled. Strategy 40 ends with step 86.

Greater reductions in the levels of tailpipe emissions are realized by use of the foregoing strategy 40. Individually, early exhaust valve opening (EVO) and CSSRE ignition timing retard increase the engine exhaust gas temperature. The synergistic combination of early EVO and CSSRE results in higher exhaust gas temperatures. These results have been experimentally verified. For example and without limitation, it was found that a seventeen degree advance in EVO, relative to the base cam EVO, with top dead center ("TDC") ignition timing resulted in a 28 degrees Celsius (50 degrees Fahrenheit) increase in exhaust gas temperature with no degradation of combustion characteristics or stability. This higher exhaust temperature generates greater heat flux in the exhaust, which improves catalyst light-off performance. A reduction in the level of engine out (e.g., feed-gas) hydrocarbon (HC) was also observed, due in part, to the post combustion oxidation of the exhaust gases in the flow passages.

In four-stroke cycle spark ignition engines that are not equipped with VVT mechanisms, the IVO typically precedes the EVC. The duration of this event, usually measured in either crank angle or cam angle degrees, is referred to as the valve overlap period. During this overlap period, a gas flow path exists between the intake and exhaust ports. Higher pressures in the exhaust port and cylinder can cause a reverse flow of residual gases from the exhaust port and cylinder into the intake port. These gases mix with the intake charge and are eventually re-introduced into the engine cylinder during the intake stroke. The overlap duration will dictate the amount of residual gases entering the intake port. Large amounts of residual gases can adversely affect the combustion process, causing partial combustion or misfire. This is especially true at idle and light load engine operation. The condition is further exacerbated when CSSRE ignition timing retard and air/fuel ratio enleanment are applied. The combined VVT, air/fuel ratio enleanment and spark timing strategies of the present invention can be used to either reduce or eliminate valve overlap during idle and/or light load conditions when CSSRE is present, thereby preventing deterioration of the combustion process.

In a second embodiment of this invention, variable valve timing system 14 is a camless type system and is used to assist fuel preparation during CSSRE cold-starting and warm-up operation. For valve trains that are camshaft actuated, fuel is typically injected/sprayed on a closed intake valve. Heat transfer from the intake valve surface is used to vaporize the injected fuel. The vaporized fuel mixes with the induction air in the port. The air/fuel mixture is then communicated to the engine cylinder or combustion chamber when the intake valve opens.

Figure 3:
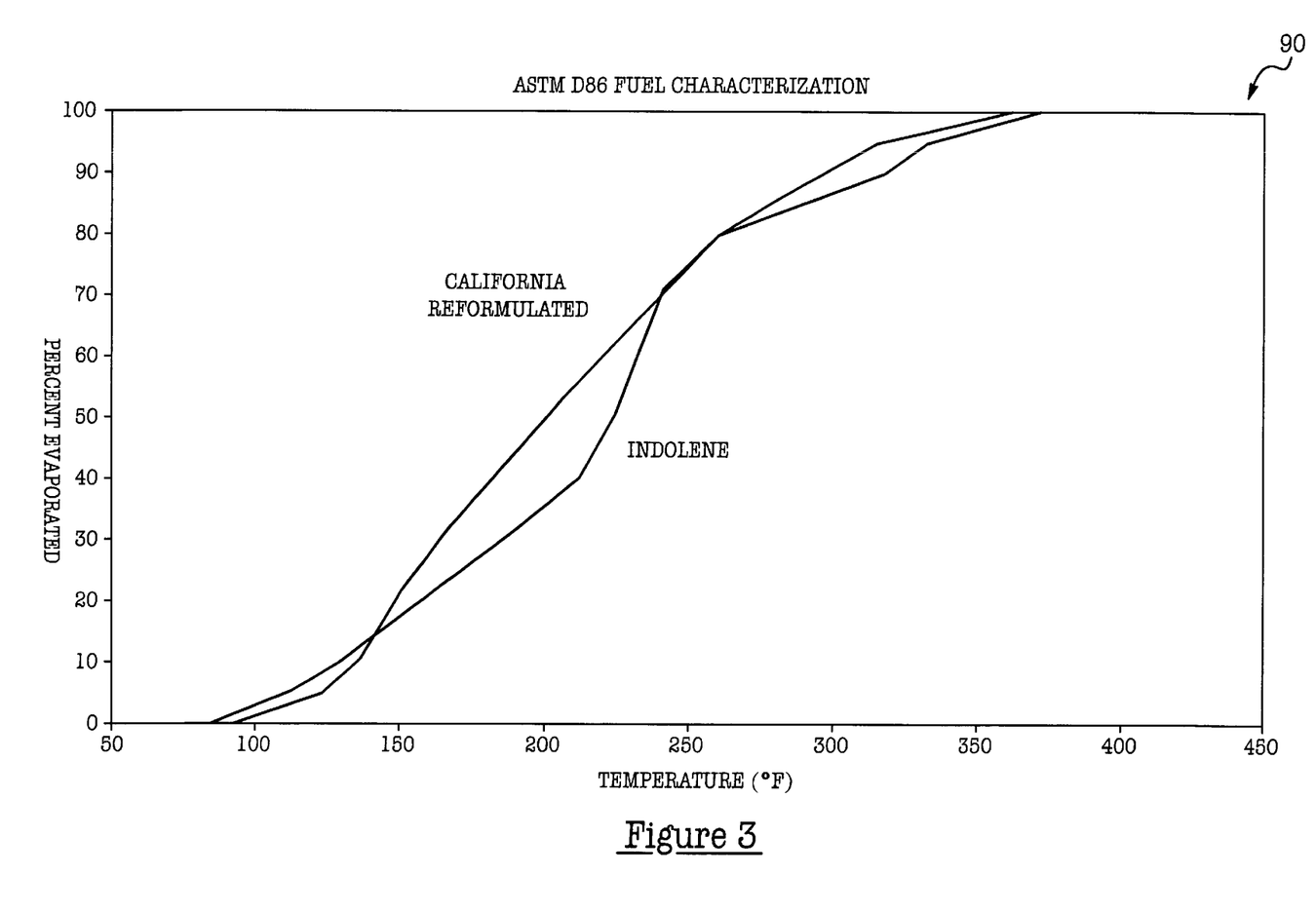
FIG. 3 is a graph illustrating the evaporation characteristics of two different types of fuel versus engine temperature.

Gasoline is composed of multiple hydrocarbons that vaporize at different temperatures. The distillation properties of two varieties of commercially available gasoline are shown in graph 90 of FIG. 3. Reduced fuel vaporization takes place during engine cold-starting and warm-up operation, because the intake valve surface has not yet reached the optimal temperatures needed to completely vaporize the liquid fuel spray droplets. At the lower valve temperatures, additional quantities of fuel are introduced into the intake port in order to ensure that a sufficient amount of vaporized fuel needed for combustion is present in the port. When the intake valve is opened, a portion of the fuel that remains in the liquid state is also transferred into the combustion chamber. The liquid fuel that does not burn during the combustion process is exhausted as unburned hydrocarbons.

A relatively thick film of liquid fuel sprayed on the intake valve adversely affects the heat transfer process. Particularly, more time is required to vaporize a relatively large mass of liquid fuel. Since the relatively large mass of liquid draws more heat from the intake valve, more time is required for the valve to reach higher operating temperatures.

The second embodiment of the present invention utilizes the camless variable valve timing system 16 to overcome the foregoing limitations during engine start-up and warm-up conditions. Particularly, the variable valve timing system 16 replaces a single injection event per intake stroke during four-stroke engine operation (current practice) with multiple (i.e., two or more) injection events per intake stroke coincident with a like number of multiple intake valve closing and opening events during the intake stroke. The injected mass of fuel may or may not be divided into equal mass quantities. In similar fashion, the additional IVC/IVO events may or may not be equally divided over the duration of the intake stroke. Multiple IVC/IVO events provide the ability to spray smaller quantities of fuel on the closed intake valve surface. Less time is needed to vaporize these smaller masses of fuel. The smaller individual masses of liquid draw less heat away from the intake valve, allowing it to heat up more rapidly. Multiple valve closings and re-openings during the intake stroke further create larger pressure gradients (higher vacuums) between the cylinder and intake port. This has the added advantage of breaking up any liquid droplets that would enter the cylinder via the intake port, thereby making them easier to combust and reducing the amount of unburned hydrocarbons in the exhaust.

Figure 4:
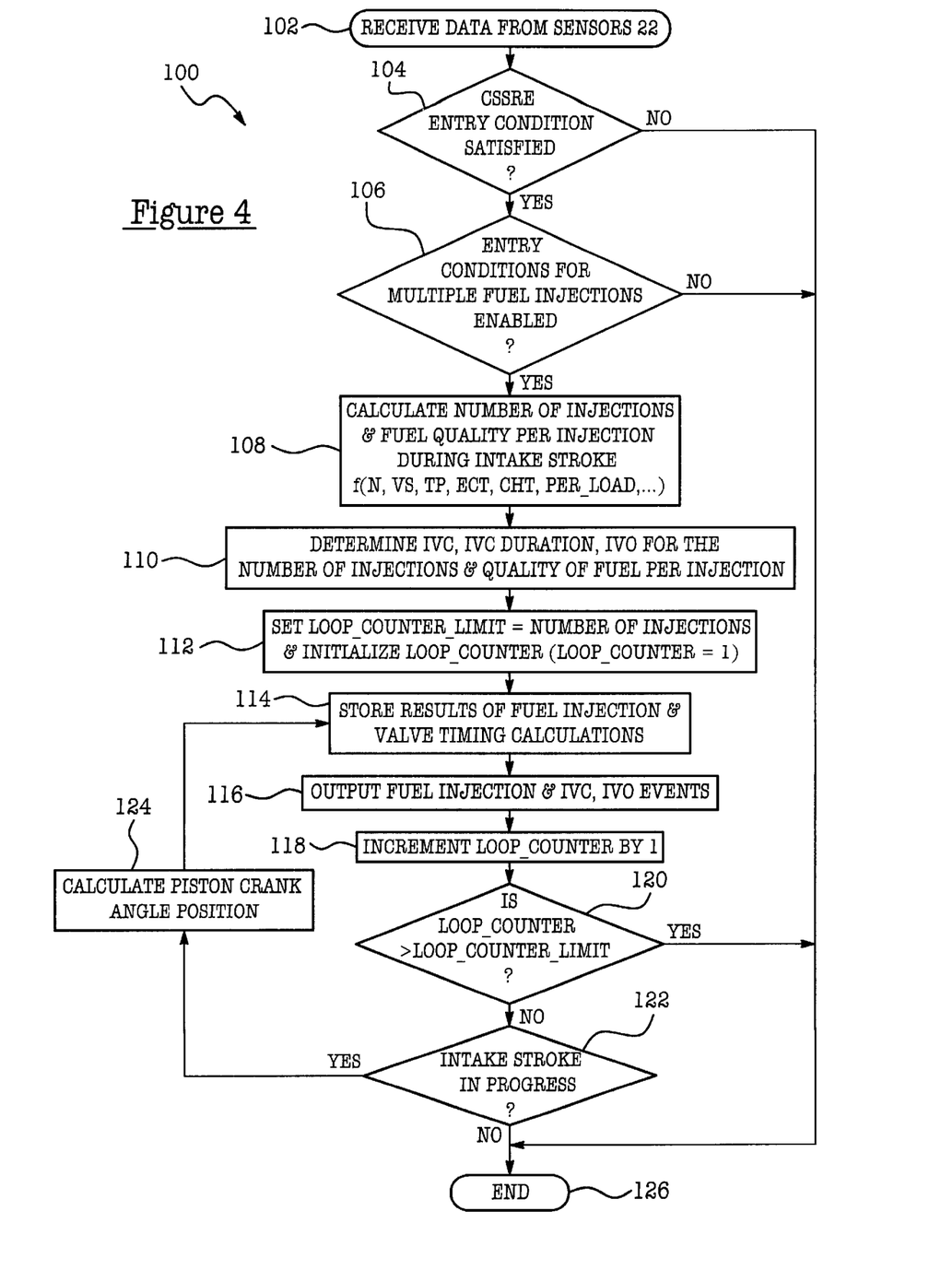
FIG. 4 is a block diagram illustrating a method used by the system shown in FIG. 1 to reduce cold-start exhaust emissions and which is performed in accordance with the teachings of a third embodiment of the present invention.

Referring now to FIG. 4, there is shown a strategy or method 100 which is performed by system 10 in accordance with the teachings of this second embodiment of the present invention. Method 100 begins with step 102, where controller 14 receives data and/or signals from vehicle sensors 22. Based upon this received data, controller 14 determines whether a "cold-start" condition exists, as shown in step 104. The determination of a "cold-start" condition is based upon one or more measured engine operating conditions, such as the temperature, load and/or speed of the engine 26, the engine throttle position, the engine coolant temperature, and the catalyst temperature or operating efficiency, which are compared to one or more calibratable parameters stored within controller 14.

If a cold-start condition is not detected the strategy ends, as shown in step 126 and the vehicle uses conventional non-CSSRE valve timing, ignition and air/fuel ratio strategies. If a cold-start condition is detected, controller 14 proceeds to step 106, where it performs one or more tests to determine whether or not a multiple fuel injection (per intake stroke) strategy should be enabled during CSSRE operation. Parameters that are tested can include, but are not limited to, engine speed ("N"), vehicle speed ("VS"), throttle position ("TP"), engine coolant temperature ("ECT"), cylinder head temperature ("CHT"), and/or engine load ("PER_LOAD"). If the measured values of these operating conditions or parameters exceed predetermined threshold values for these parameters, controller 14 proceeds to step 108.

In step 108, controller 14 calculates the total quantity of injected fuel per intake stroke as a function of the CSSRE air/fuel ratio schedule or strategy. Controller 14 further determines the number of injections and fuel quantity per injection during the intake stroke as a function of N, VS, TP, ECT, CHT, PER_LOAD, and/or other engine/vehicle operating parameters. Controller then proceeds to step 110, where it determines and/or computes the timing of the IVC and IVO events (e.g., relative to the crank angle position in the intake stroke) and duration of the events, based on the calculated or desired number of injections per intake stroke, fuel quantity per injection, and other operating conditions. In one non-limiting embodiment, a single continuous injection is used, during which multiple valve actuations (i.e., openings and closings) are performed. In step 112, which follows step 110, controller 14 sets a loop counter limit parameter to a value equal to the computed number of injections, and initializes an internal loop counter by setting it to a value of one. In step 114, the results of the fuel and valve timing calculations are stored within controller 14. The first fuel injection quantity and IVC/IVO event are then scheduled and performed, as shown in step 116. Particularly, controller 14 generates commands to fuel metering system 20 and variable valve timing system 16 to execute the desired injection and valve events. After the scheduled event is performed, the loop counter is incremented by one, as shown in step 118, and the loop counter is compared to the loop counter limit, as shown in step 120. If the loop counter is greater than the loop counter limit, the strategy ends, and is subsequently repeated until CSSRE and multiple fuel injection conditions are ended. If the loop counter is not greater than the loop counter limit, controller 14 performs a test to determine whether or not the intake stroke is in progress, as shown in step 122. If the intake stroke is still in progress, a calculation is made to determine the crank angle position of the piston during the intake stroke, as shown in step 124. Based on the location of the piston, the appropriate stored values for the next fuel injection quantity and IVC/IVO event are scheduled, performed, and the loop counter is incremented by one. Steps 114–124 are repeated until the loop counter value is greater than the loop counter limit value or the intake stroke is no longer in progress.

It should be understood that Applicants' inventions are not limited to the exact methods 40, 100 which have been described herein, but that various changes and/or modifications may be made without departing from the spirit and/or the scope of Applicants' inventions. For example and without limitation, methods 40, 100 may include different or additional steps and may perform the disclosed steps and/or other steps in a different order or manner.

What is claimed is:

1. A system for reducing emissions of a vehicle of the type having an engine, a variable valve timing system which controls valve timing events of said engine, an ignition system which controls spark timing of said engine, and a fuel metering system which controls air/fuel delivery to said engine, said system comprising:

at least one sensor which is effective to measure at least one vehicle operating condition and to generate sensor signals representing said measured at least one vehicle operating condition; and a controller which is communicatively coupled to said at least one vehicle sensor, to said variable valve timing system, to said ignition system, and to said fuel metering system, said controller being effective to receive said sensor signals and based upon said received sensor signals to detect a cold-start condition, and being further effective, in response to said detection, to generate command signals to said variable valve timing system, to said ignition system, and to said fuel metering system, effective to respectively alter said valve timing, said spark timing, and said air/fuel delivery in a manner which synergistically extends air/fuel enleanment limits, improves combustion characteristics, and increases exhaust gas temperature, thereby reducing cold-start emissions.

2. The system of claim 1 wherein said altered valve timing events comprise exhaust valve opening events.

3. The system of claim 1 wherein said altered valve timing events comprise intake valve closing events.

4. The system of claim 1 wherein said altered valve timing events comprise intake valve opening and exhaust valve closing events, and wherein said intake valve opening and exhaust valve closing events are altered to control valve overlap.

5. The system of claim 1 wherein said altered valve timing events comprise exhaust valve opening events, exhaust valve closing events, intake valve opening and intake valve closing events.

6. The system of claim 1 wherein said variable valve timing system comprises a camless type system.

7. The system of claim 1 wherein said variable valve timing system comprises at least one cam timing assembly.

8. A method of reducing emissions of a vehicle of the type having an engine, said method comprising the steps of:
   detecting a cold-start condition; and
   selectively and synergistically altering valve timing, spark timing, and air/fuel delivery to said engine, effective to increase combustion efficiency and exhaust gas temperature, thereby reducing cold-start emissions.

9. The method of claim 8 wherein said valve timing is altered by use of a variable valve timing system.

10. The method of claim 9 wherein said cold-start condition is detected by monitoring a plurality of vehicle parameters.

11. The method of claim 10 wherein said plurality of vehicle parameters comprise catalyst temperature.

12. The method of claim 11 wherein said plurality of vehicle parameters further comprise throttle position, vehicle speed, engine coolant temperature, and catalyst temperature.

13. The method of claim 8 further comprising the steps of:
    monitoring feedback data; and
    adaptively updating said valve timing, spark timing, and air/fuel delivery based upon said monitored feedback data.

14. A method of reducing emissions of a vehicle of the type having an engine including a combustion chamber with at least one valve, and a fuel injector which discharges an amount of fuel which is delivered to said chamber through said at least one valve, said method comprising the steps of:
    causing said fuel injector to discharge said amount of fuel through multiple injections during said intake stroke; and
    selectively opening and closing said at least one valve multiple times during an intake stroke of said engine, thereby increasing vaporization of said amount of fuel, effective to extend air/fuel enleanment limits, improve combustion characteristics, and increase exhaust gas temperature, thereby reducing emissions.

15. The method of claim 14 wherein said at least one valve is selectively opened and closed by use of at least one electromechanical actuator.

16. The method of claim 14 wherein said at least one valve is selectively opened and closed by use of at least one electrohydraulic actuator.

17. The method of claim 14 further comprising the steps of:
    calculating a piston crank angle position; and
    utilizing said piston crank angle position to determine when to selectively open and close said at least one intake valve.

* * * * *